2,913,372
Patented Nov. 17, 1959

2,913,372

COMPOSITIONS FOR DISPERSING POWDERS IN WATER

Hermann Velde and Paul Linke, Essen, Germany, assignors to Atlas Powder Company, Wilmington, Del., a corporation of Delaware No Drawing. Application July 23, 1954
Serial No. 445,476

3 Claims. (Cl. 167—42)

The present invention relates to compositions for dispersing powders in water.

An object of the invention is to provide an improved composition for dispersing powdered solids in water.

Another object of the invention is to provide improved water-dispersible powders.

A further object is to provide improved aqueous dispersions of powdered solid materials.

The above and other objects will become apparent in the course of the following description.

It is well known that, in order to stably suspend powdered substances or mixtures of substances of inorganic and/or organic types in water, wetting and suspending agents are added. The object of these agents is, on the one hand, to increase the wettability of the powders by water, so that clumping does not occur when these are added to water, and on the other hand, to decrease the velocity of sinking in water so that the powders may remain suspended as long as possible even in application equipment in which no or only very little stirring is provided. This is, for example, important in the manufacture of insecticides and herbicides which are to be applied in the form of dispersible powders, or in washing processes of any kind, also in flotation, in emulsions in which solid substances are to be suspended simultaneously such as, e.g. metal cleaning agents, polishes, etc.

To date, surfactants of the anionic or non-ionic type have been used as wetting and suspending agents, such as for example soaps, alkyl aryl sulfonates, fatty alcohol sulfates, polyethylene oxide adducts of fatty alcohols and also natural materials which swell or disperse in water or products derived therefrom such as cellulose derivatives e.g. methyl cellulose, also starch, dextrin, sugar, cellulose pitch, alginates, bentonite, etc. Polyvinyl compounds such as polyvinyl alcohol can also be employed for this purpose. All of these materials have the disadvantage that, even though used in relatively large quantities, they will decrease the velocity of sinking of the suspended substances in dilute, low-viscosity aqueous suspensions only to a very limited extent. Thus, for example, in most insecticides in powder form having a usual dispersing agent content ranging from 5–15% and in some cases even 70%, more than 25–30% and often even a higher amount of the suspended substances will have settled out of a 1% aqueous dispersion after standing only 10 minutes. After standing for one-half hour, frequently more than 40–50% of the solid components will have settled to the bottom.

It has now been found that the suspension properties of powdered substances can be significantly increased if the wetting and suspending agent used is a mixture of a water-soluble or dispersible non-ionic surface active agent and a carboxylic acid substance that is difficulty soluble or insoluble in water.

The non-ionic surface active agent is preferably a water-soluble or water-dispersible polyoxyethylene adduct of a hydrophobic organic compound containing an active hydrogen atom. Examples of suitable surface active agents are: long chain aliphatic and/or resin carboxylic acid esters of polyoxyethylene ethers of sorbitol, such as, laurates, oleates, and tall oil esters of polyoxyethylene ethers of sorbitol containing from 4 to 30 oxyethylene groups per mol; polyoxyethylene ethers of partial esters of long chain aliphatic and/or resin carboxylic acids of mono- or di-anhydro sorbitol, such as, 20 polyoxyethylene sorbitan monooleate (the numeral referring to the average number of oxyethylene groups per mol of sorbitan monooleate); polyoxyethylene ethers of $C_{12}$ to $C_{20}$ aliphatic monohydric alcohols, such as, 10 polyoxyethylene tridecyl alcohol.

The carboxylic acids useful in the composition of the invention are the water-insoluble or difficulty soluble acids. The water-insoluble salts and esters of these acids with polyhydric and high molecular weight alcohols are likewise useful. The acids may be monobasic or polybasic, aliphatic, cyclo-aliphatic or cyclic and may be substituted if desired. Most appropriate are fat acids such as palmitic, stearic, arachidic and behenic, wax acids including those of synthetic origin (as Gersthofen-wax S), mixed aliphatic-aromatic carboxylic acids, cyclic carboxylic acids such as abietic acid or rosin acids, and the corresponding salts such as calcium palmitate.

The use of the agents of the invention is not limited, however, solely to the mixtures described above. Conventional wetting and suspending agents as mentioned above or similar substances, as well as adhesives, can also be used simultaneously. The sulfonic acids such as butyl naphthalene sulfonic acid or dodecyl benzene sulfonic acid and the corresponding salts can be used.

Dispersible powders according to this invention contain from 0.5–15% of the surface active agent and from 0.1–15% of the carboxylic acid on the basis of the final mixture. The dispersing composition itself may, correspondingly, contain from 1 to 5 parts surface active agent to 1 part of carboxylic acid.

The dispersing compositions of the invention are mixed with the powders to be dispersed according to methods which are well-known to those familiar with the art, such as mechanical mixing or milling as well as by application in dissolved or emulsified form. The compositions of the invention can be added to the powders either as individual components or in the form of a mixture. If such agents are liquids, pastes, or waxy materials, they can be converted to the solid, pulverizable form by conversion into urea adducts in the known manner, or their melting point can be raised by the addition of, for example, high molecular waxes, esters, carbohydrates, and the like. It is also possible to melt together the agents of the invention as well as other substances used. Furthermore, the agents can also be converted to a pourable or powdered form by mixing them at ratios ranging from 1:1 to 1:5 with fillers and/or toxicants.

The advantage of the agents of this invention primarily consists of the fact that used in conventional amounts, they reduce the velocity of settling of powdered substances or mixtures of substances dispersed in water to an extent not heretofore known. To obtain this it is not even necessary to have the substances to be dispersed in an extremely finely divided state. Furthermore the agents of the invention have the advantage that the powders with which they are mixed will, upon stirring in water, precipitate in a very loose and readily redispersible form.

The agents of the invention are therefore singularly appropriate for the manufacture of dispersible, powdered insecticides and herbicides. Furthermore the agents can be used advantageously in all cases where it is desired to slow down precipitation of substances dispersed in water, such as in washing or flotation processes.

Example 1

90 parts of a mixture consisting of 20 parts γ-hexachlorocyclohexane, such as is available to the trade under the designation Lindane, and of 75 parts kaolin are mixed with 5 parts of a 40 polyoxyethylene sorbitol penta tall oil ester and 5 parts of a blend of 60% arachidic and 40% behenic acid. From a 1% dispersion of the product in water, 12, 17, and 20% of the solids settle at the bottom after 10, 30 and 60 minutes respectively. From the same Lindane-kaolin mixture, which, however, has only been blended with 5 and 20% tall oil ester respectively, the entire solids content precipitates from a 1% dispersion after already 30 and 60 minutes, respectively.

Example 2

A product is prepared consisting of 90 parts of the above-mentioned Lindane-kaolin mixture, 5 parts of a blend of 70% of 16 polyoxyethylene sorbitan mono-tall oil ester with 30% of the isopropyl amine salt of dodecyl benzene sulfonic acid and 5 parts calcium palmitate. From a 1% dispersion within 10, 30, and 60 minutes respectively only 10, 18, and 27% resp. of the solids settle out. In contrast thereto, a powder consisting of 95 parts Lindane-kaolin mixture and 5 parts of the above-mentioned emulsifier mixture (without the carboxylic acid salt) completely settles to the bottom from a 1% dispersion within 10 minutes. When 20 parts of the emulsifier mixture are added to 80 parts of a Lindane-kaolin blend, the amount of solids which precipitates within 10 minutes is only reduced to 88%.

Example 3

From a 1% dispersion of the mixture mentioned in Example 1, in which 5% abietic acid is used in place of the arachidic and behenic acid, 22, 30 and 39% respectively of the solids settle within 10, 30, and 60 minutes respectively.

Example 4

From 1% dispersions of the above-mentioned Lindane-kaolin mixture which is blended with 5% of the tall oil ester mentioned in Example 1 and with 5% Gersthofen-wax S, 15, 21, and 29% of the solids precipitate within the above periods of time.

Example 5

From a 1% dispersion of the above Lindane-kaolin mixture which is blended with 10% of a mixture consisting of equal parts of 20 polyoxyethylene sorbitan monooleate and stearic acid, which have been melted together, 11, 16 and 19% respectively of the solids precipitate within the periods of time mentioned.

Example 6

87.5 parts of the Lindane-kaolin mixture are blended with 12.5 parts dispersing agent consisting of 5 parts of the emulsifier mixture mentioned in Example 2, 5 parts stearic acid, and 2.5 parts urea. From a 1% dispersion of this product, the solids content which precipitates after 10, 30 and 60 minutes respectively, only amounts to 2, 7 and 10% respectively.

Example 7

A mixture consisting of 45 parts Lindane, 45 parts kaolin, 5 parts of the emulsifier mentioned in Example 1 and 5 parts stearic acid results in 1% dispersion, in which after the periods of time mentioned 12, 16 and 24% respectively of the solids settle to the bottom.

Example 8

A mixture consisting of 20 parts DDT and 75 parts kaolin is blended with 7% of the sorbitan ester mentioned in Example 5 as well as with 3% stearic acid. The amount of solids which precipitate after the above periods of time equals 11, 15 and 17% respectively.

Example 9

From a 1% dispersion of a mixture consisting of 20 parts chlorinated camphene which is sold under the trade-mark "Toxaphene," 70 parts kaolin, 5 parts of sorbitan ester mentioned in Example 5 and 5 parts lauric acid, 13, 26, and 33% respectively of the solids settle to the bottom within the periods of time mentioned.

Example 10

In 1% dispersion of mixtures consisting of 10 parts Lindane, 10 parts DDT and 70 parts kaolin, to which 5% of the sorbitan ester mentioned in Example 5 and 3% of a stearic acid (made by hydrogenation) have been added, the quantity of solids which settle to the bottom after 10, 30 and 60 minutes respectively amounts to 19, 29, and 35% respectively.

Example 11

A product which is made from 80 parts of the Lindane-kaolin mixture of Example 1, 3 parts stearic acid and 17 parts of a urea adduct consisting of 1 part 20 polyoxyethylene sorbitan monooleate and 3 parts urea only precipitates 9, 17, and 22% respectively of the solids within the periods of time indicated. In dispersions of the same product, which has, however, been made without stearic acid, the entire solids content has precipitated after 10 minutes.

Example 12

A powder consisting of 93 parts of the Lindane-kaolin mixture of Example 1, 5 parts of 23 polyoxyethylene lauryl alcohols and 2 parts stearic acid is dispersed at 1%. After 10, 30 and 60 minutes respectively only 8, 13 and 29% of the solids have settled.

Example 13

A 1% dispersion is prepared from a chalk powder mixed with 2% of a 30 polyoxyethylene sorbitol tetra ester of mixed oleic and lauric acids and 1% stearic acid. After 10, 30, and 60 minutes respectively, 22, 56 and 78% of the solids have precipitated. If the stearic acid is omitted, the entire solids content settles within 30 minutes.

Example 14

In mixtures of one part copper oxychloride and 2 parts chalk, to which 2% of the emulsifier mixture of Example 2 and 1% stearic acid are added, the amount of solids which settle to the bottom from a 1% dispersion after 10, 30, and 60 minutes respectively is 19, 38, and 50%. In the absence of the stearic acid, on the other hand, 38, 62, and 70% of the solids precipitate within the time intervals mentioned.

What is claimed is:

1. A powder composition dispersible in water, comprising a finely divided water-insoluble solid toxicant, a finely-divided water-insoluble filler and a water-soluble to water-dispersible polyoxyethylene reaction product of a composition selected from the group consisting of long chain aliphatic esters of polyhydric alcohols, rosin acid esters of polyhydric alcohols and long chain fatty monohydric alcohols and a water insoluble carboxylic acid substance selected from the group consisting of free acids and water-insoluble salts of said acids.

2. A powder composition as in claim 1 wherein the said polyoxyethylene reaction product is from about 0.5% to about 15.0% by weight of said powdered toxicant and said powdered filler and said carboxylic acid substance is from about 0.1% to about 15.0% by weight of said powdered toxicant and said powdered filler.

3. An aqueous dispersion comprising water, a dispersed finely-divided water-insoluble powdered toxicant, a dispersed finely-divided water-insoluble filler and a water-soluble to water-dispersible polyoxyethylene reaction product of a composition selected from the group consisting of long chain aliphatic esters of polyhydric alcohols, rosin acid esters of polyhydric alcohols and long chain fatty monohydric alcohols and a water insoluble carboxylic acid substance selected from the group consisting of free acids and water-insoluble salts of said acids.

References Cited in the file of this patent

UNITED STATES PATENTS

| | | |
|---|---|---|
| 1,707,469 | Knight | Apr. 2, 1929 |
| 2,264,762 | Knight | Dec. 2, 1941 |
| 2,346,362 | Dolman | Apr. 11, 1944 |
| 2,404,913 | Leiserson | July 30, 1946 |
| 2,523,420 | Burrage | Sept. 26, 1950 |
| 2,529,682 | Flenner | Nov. 14, 1950 |
| 2,556,820 | Nease | June 12, 1951 |
| 2,630,411 | Harris | Mar. 3, 1953 |
| 2,664,381 | Omohundro | Dec. 29, 1953 |
| 2,665,256 | Barker | Jan. 5, 1954 |

OTHER REFERENCES

"Drug and Cos. Emulsions," 1946, Atlas Powder Co., Wil. Del., p. 25.

Frear: Chem. of Insect., Fung., and Herb., 2nd ed., 1948, p. 67.